US008496895B2

(12) United States Patent
Lee et al.

(10) Patent No.: US 8,496,895 B2
(45) Date of Patent: Jul. 30, 2013

(54) EXHAUST GAS TREATING APPARATUS AND TREATING METHOD FOR CARBON DIOXIDE CAPTURE PROCESS

(75) Inventors: Hyung-Keun Lee, Daejeon (KR); Won-Kil Choi, Daejeon (KR); Hang-Dae Jo, Daejeon (KR); Chang-Keun Yi, Daejeon (KR); Sung-Ho Jo, Daejeon (KR); Young-Cheol Park, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/360,159

(22) Filed: Jan. 27, 2012

(65) Prior Publication Data
US 2013/0028820 A1    Jan. 31, 2013

(30) Foreign Application Priority Data
Jan. 28, 2011    (KR) .................. 10-2011-0008630

(51) Int. Cl.
*B01D 53/34* (2006.01)
*B01D 53/50* (2006.01)
*B01D 53/56* (2006.01)
*B01D 53/62* (2006.01)
*B01D 53/64* (2006.01)
*B01D 53/74* (2006.01)
*B01D 53/75* (2006.01)

(52) U.S. Cl.
USPC ..... 423/210; 423/235; 423/239.1; 423/215.5; 423/242.1; 423/240 R; 423/220; 422/168; 422/169; 422/170; 422/171; 422/172; 422/177

(58) Field of Classification Search
USPC .............. 423/235, 239.1, 215.5, 242.1, 210, 423/240 R, 220; 422/168–172, 177
See application file for complete search history.

(56) References Cited

U.S. PATENT DOCUMENTS
2011/0052453 A1*   3/2011   McLarnon et al. ........... 422/170

FOREIGN PATENT DOCUMENTS
KR    10-2010-0074310 A    7/2010

OTHER PUBLICATIONS
English language abstract of KR 10-2010-0074310 A, listed as PF1 on accompanying form PTO/SB/08a, Jul. 2010.

* cited by examiner

*Primary Examiner* — Timothy Vanoy
(74) *Attorney, Agent, or Firm* — Sterne, Kessler, Goldstein & Fox P.L.L.C.

(57) ABSTRACT

Disclosed are an exhaust gas treating apparatus and a treating method for a carbon dioxide capture process, in which harmful substances remaining in the exhaust gas discharged from the conventional flue-gas desulfurization process are additionally removed for efficient performance of the carbon dioxide capture process. According to the exhaust gas treating apparatus for a carbon dioxide capture process, it has the effects of minimizing the installation space of desulfurization equipment and reducing the process cost. In addition, by keeping the contaminants contained in the gas introduced in the carbon dioxide capture equipment below a proper level, absorption performance can be improved as degradation of the absorbent used in the carbon dioxide capture process is prevented. After all, it has an advantage of preventing the pollution by the exhaust gas discharged into the atmosphere.

10 Claims, 3 Drawing Sheets

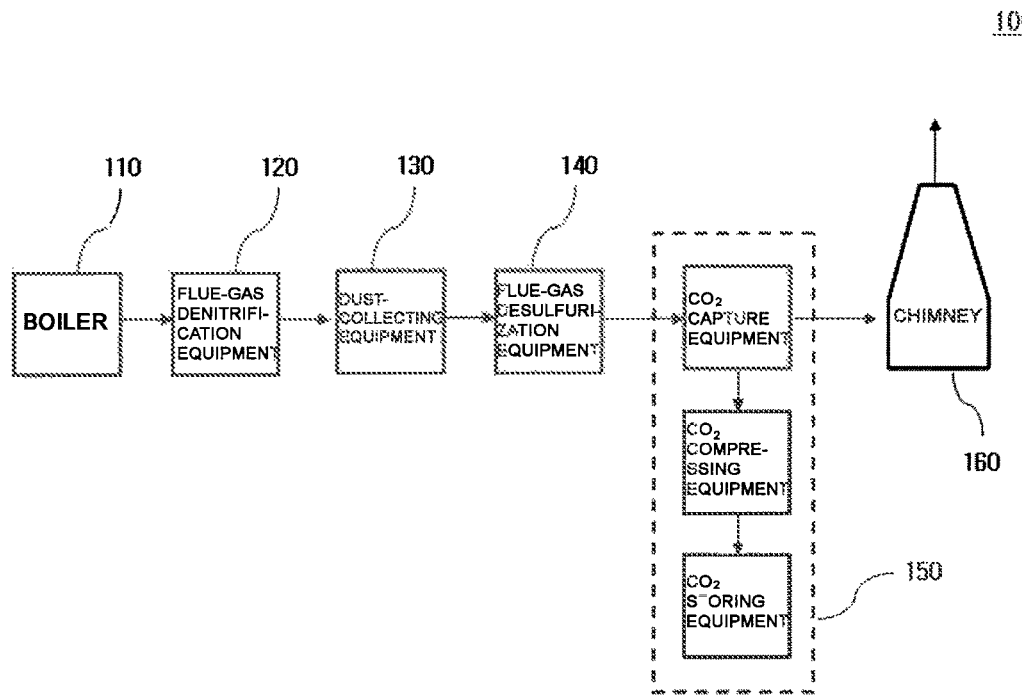

EXHAUST GAS TREATING APPARATUS AND TREATING METHOD FOR CARBON DIOXIDE CAPTURE PROCESS

CROSS REFERENCE TO RELATED APPLICATIONS

This application claims priority from Korean Patent Application No. 10-2011-0008630, filed on Jan. 28, 2011 in the Korean Intellectual Property Office, the entire disclosure of which is incorporated herein by reference.

BACKGROUND OF THE INVENTION

1. Field of the Invention

The present invention relates to an exhaust gas treating apparatus and a method thereof, and more specifically to an exhaust gas treating apparatus and a treating method for a carbon dioxide capture process, in which harmful substances remaining in the exhaust gas discharged from the conventional flue-gas desulfurization process are additionally removed for efficient performance of the carbon dioxide capture process.

2. Background Art

With the earnest development of $CO_2$ capture and storage (below to be referred to as 'CCS') technology for reduction of greenhouse gas emissions, the level of carbon dioxide capture technology has reached the commercialization stage, and CCS equipment is being installed and operated in existing thermal power generation facilities.

In particular, coal discharges a lot of carbon dioxide because its carbon (C)/hydrogen (H) ratio is high among fossil fuels. So a major objective for the coal thermal power plant using coal as fuel is to reduce $CO_2$ emissions.

FIG. 1 is a block diagram showing an exhaust gas treating system of a conventional coal burning thermal power plant.

With reference to FIG. 1, in the conventional exhaust gas treating system of a coal burning thermal power generation plant, the contaminants are removed from the exhaust gas discharged from the boiler 110 through flue-gas denitrification equipment 120, dust-collecting equipment 130 and flue-gas desulfulization equipment 140, before carbon dioxide is captured through carbon dioxide capture equipment 150 to be compressed and stored, and the exhaust gas is discharged into the atmosphere through a stack 160.

As shown in FIG. 1, in the case of the conventional exhaust gas treating system of a coal burning thermal power plant, most of them are equipped with flue-gas desulfurization equipment 140 and flue-gas denitrification equipment 120, so about 90% of sulfur oxide ($SO_x$) and nitrogen oxide ($NO_x$) contained in the exhaust gas is removed before it is discharged.

However, even after the exhaust gas has passed through the denitrification equipment and desulfurization equipment, the exhaust gas contains about 50 ppm to 100 ppm of $SO_x$ and $NO_x$. If the exhaust gas containing sulfur oxides ($SO_x$) and nitrogen dioxide ($NO_2$) that exists at about 5% in total nitrogen oxides ($NO_x$) is introduced into a carbon dioxide ($CO_2$) capture process, the operation efficiency and the economic efficiency decrease due to degradation by an absorbent, especially an amine based absorbent or an alkali absorbent, used in the carbon dioxide ($CO_2$) capture process.

Furthermore, the recycling slurry of the flue-gas desulfurization equipment contains about 8,000 to 20,000 ppm of chlorine ions ($Cl^-$) and about 4,000 to 8,000 ppm of sulfate ions. If these ions are contained in fine droplets and finally introduced into the carbon dioxide ($CO_2$) capture process, they react with the absorbent to form sulfate ($SO_4^{2-}$)/chloride ($Cl^-$) compounds so as to lower the reactivity of the absorbent. Therefore, inflow of fine droplets containing such ions should be thoroughly cut off.

In the conventional coal-burning thermal power plant, usually a selective catalyst reduction (SCR) process is used for the flue-gas denitrification process to treat nitrogen oxides. At this time, the removal efficiency is determined in accordance with the $NO_x$ emission standard, and the change and the charge of catalyst or the feed of ammonia or urea solution is determined accordingly. At this time, in order to prevent the inflow of nitrogen dioxide ($NO_2$) existing at about 5% in nitrogen oxides into the carbon dioxide ($CO_2$) capture process, the additional apparatuses are necessary.

Coal contains harmful heavy metal components (HAPs) such as mercury, and they are finally discharged into the atmosphere in the combustion process. So various methods, such as an oxidation catalytic treatment apparatus, a halogenation treatment apparatus or an activated carbon adsorption tower, have been developed to remove HAPs from flue gases.

In order to apply a $CO_2$ capture process to a coal burning thermal power plant wherein exhaust gases containing various contaminants are discharged, a pretreatment process is required to maintain sulfur dioxide ($SO_2$) below 10 ppm and remove contaminants. Accordingly, there has been an increasing necessity that the existing flue-gas desulfurization process is substantially retrofitted or the secondary flue-gas desulfurization equipment is additionally installed.

However, to maintain the concentration of discharged sulfur dioxide ($SO_2$) below 10 ppm by raising the desulfurization efficiency to about 99.5% using the existing flue-gas desulfurization process, the physical size of the absorption tower should be significantly increased and the packing materials and interior structure should be completely retrofitted.

Also, to increase the circulation rate of the absorbent slurry, basic equipment or apparatus such as a circulating pump should be added or replaced with the larger one. Therefore, in the case that $CO_2$ capture equipment is to be added to the equipment that was already installed and is in operation, it is impossible to use the existing flue-gas desulfurization equipment by retrofitting it and additional secondary flue-gas desulfurization equipment should be introduced.

FIG. 2 is a block diagram showing an exhaust gas treating system provided with flue-gas desulfurization equipment of a conventional coal burning thermal power plant.

As shown in FIG. 2, in a conventional exhaust gas treating system 200 of a coal burning power plant, after removing contaminants from the exhausts gas discharged from a boiler 210 through flue-gas denitrification equipment 220, dust collecting equipment 230 and first flue-gas desulfurization equipment 240 and secondary flue-gas desulfurization equipment 250, carbon dioxide is captured through carbon dioxide capture equipment 260, and it is compressed and stored, and the exhaust gas is discharged into the atmosphere through a stack 270.

On the other hand, the secondary flue-gas desulfurization equipment 250 is equipped with a mercury halogenation apparatus 251, a secondary desulfurization and mercury absorption apparatus 252, an ion absorption apparatus 253 and denitrification and absorption equipment 254, and these are connected in series.

Since the secondary desulfurization equipment has various parts arranged in series to remove contaminants contained in the gas discharged from the first desulfurization equipment, a large installation space is necessary. Also, an enormous installation cost is required and the operation cost for the processes also rapidly increases, so there is a problem of overall cost increase.

BRIEF SUMMARY OF THE INVENTION

Therefore, it is an object of the present invention to provide an exhaust gas treating apparatus and a treating method in which a reactor that can carry out additional desulfurization and denitrification processes for an exhaust gas discharged from flue-gas desulfurization equipment, so that the contaminants of the gas to be supplied into the carbon dioxide capture process can be additionally removed.

In order to accomplish the above object, there is provided an exhaust gas treating apparatus, in which an exhaust gas is fed to the carbon dioxide capture equipment after removing contaminants included in the exhaust gas by successively passing the exhaust gas discharged from combustion equipment for burning coal or petroleum through flue-gas denitrification equipment, dust collection equipment and flue-gas desulfurization equipment, the apparatus comprising: secondary flue-gas desulfurization equipment installed at a rear end of the flue-gas desulfurization equipment; and a reactor provided in the secondary flue-gas desulfurization equipment, wherein the reactor performs, in one reacting container, a process of removing contaminants containing nitrogen oxides, sulfur oxides and mercury remaining in the gas discharged from the flue-gas desulfurization equipment.

Further, in order to accomplish the above object, there is provided an exhaust gas treating method, in which a carbon dioxide capture process is carried out after removing contaminants included in the exhaust gas by successively carrying out a flue-gas denitrification process, a dust collection process and a flue-gas desulfurization process for the exhaust gas discharged from combustion equipment for burning petroleum or coal, the method comprising: a secondary flue-gas desulfurization process for removing contaminants containing nitrogen oxides, sulfur oxides and mercury remaining in the gas discharged after the flue-gas desulfurization process, before carrying out the carbon dioxide capture process.

According to the exhaust gas treating apparatus for a carbon dioxide capture process, it has the effects of minimizing the installation space of desulfurization equipment and reducing the process cost.

In addition, by keeping the contaminants contained in the gas introduced in the carbon dioxide capture equipment below a proper level, absorption performance can be improved as degradation of the absorbent used in the carbon dioxide capture process is prevented. After all, it has an advantage of preventing the pollution by the exhaust gas discharged into the atmosphere.

BRIEF DESCRIPTION OF THE FIGURES

The above and other objects, features and other advantages of the present invention will be more clearly understood from the following detailed description taken in conjunction with the accompanying drawings, in which:

FIG. 1 is a block diagram showing an exhaust gas treating system of a conventional coal burning thermal power plant;

FIG. 2 is a block diagram showing an exhaust gas treating system provided with flue-gas desulfurization equipment of a conventional coal burning thermal power plant;

DETAILED DESCRIPTION OF THE INVENTION

Hereinafter, preferred embodiments of the present invention will be described in more detail through the following examples.

Figure 3:
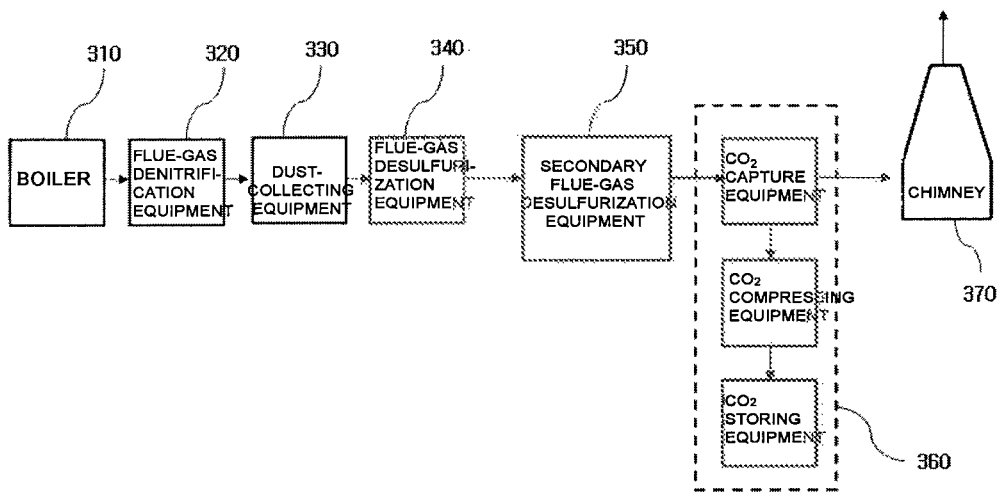
FIG. 3 is a block diagram showing the configuration of an exhaust gas treating apparatus for a carbon dioxide capture process according to the present invention.
Figure 4:
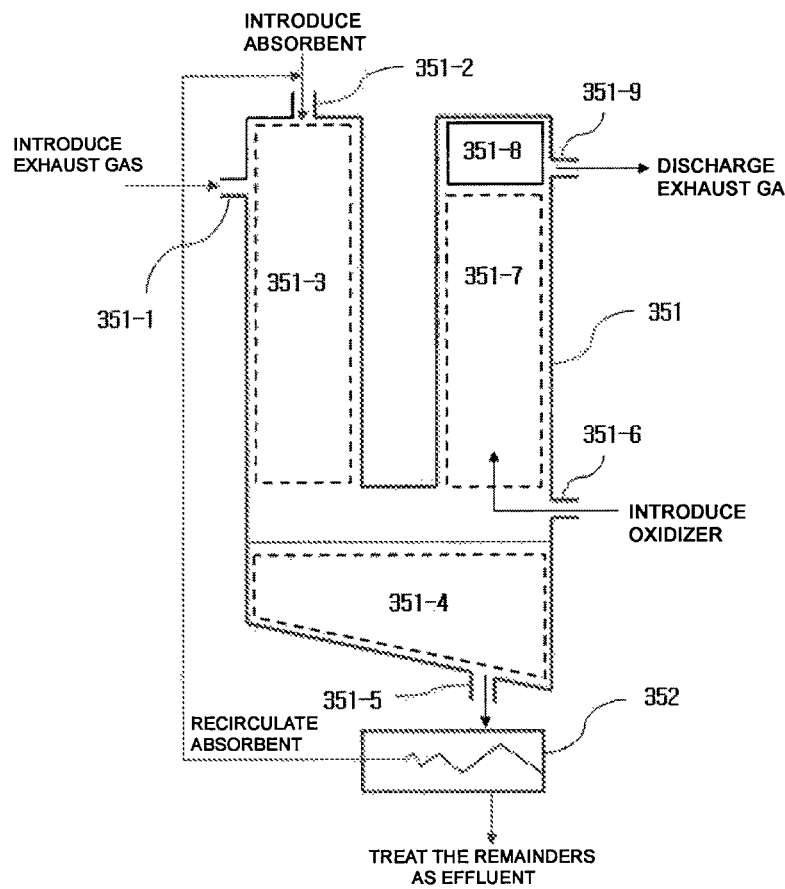
FIG. 4 is a drawing showing in detail the configuration of secondary desulfurization equipment in the exhaust gas treating apparatus according to the present invention of FIG. 3.

FIG. 3 is a block diagram showing the configuration of an exhaust gas treating apparatus for a carbon dioxide capture process according to the present invention, and FIG. 4 is a drawing showing in detail the configuration of secondary desulfurization equipment in the exhaust gas treating apparatus according to the present invention of FIG. 3.

Referring to FIG. 3 and FIG. 4, an exhaust gas treating apparatus 300 according to the present invention includes a boiler 310, flue-gas denitrification equipment 320, dust-collecting equipment 330, flue-gas desulfurization equipment 340, secondary flue-gas desulfurization equipment 350 and carbon dioxide capture equipment 360 which are arranged in series.

Since the present invention is characterized by including the secondary flue-gas desulfurization equipment 350 between the flue-gas desulfurization equipment 340 and the carbon dioxide capture equipment 360, the configuration and operation of the secondary flue-gas desulfurization equipment 350 will be described with priority. On the other hand, since the flue-gas denitrification equipment 320, dust-collecting equipment 330, flue-gas desulfurization equipment 340 and carbon dioxide capture equipment 360 are identical to the conventional ones, a detailed description thereof will be omitted.

The secondary flue-gas desulfurization equipment 350 comprises a reactor 351 and absorbent recovery equipment 352.

In the reactor 351 of the present invention, a desulfurization reaction for removing sulfur oxides by spraying alkali absorbent on the exhaust gas introduced from the flue-gas desulfurization equipment 34U, an ion absorption reaction for absorbing sulfate ions and chlorine ions in fine droplets, a denitrification reaction for oxidizing and absorbing nitrous oxide by spraying oxidizer, and a mercury absorption reaction for oxidizing and absorbing mercury in an elemental state are carried out in one reaction vessel. On the other hand, the treating apparatus of the present invention has a structure in which the droplets of alkali absorbent are kept off by separating fine droplets, after desulfurization, ion absorption and denitrification and mercury absorption reactions.

The absorbent recovery apparatus 352 recovers absorbent from the reactant discharged from under the reactant capturing part 351-4 in the reactor 351 and recycles it and treats the remainder as effluent.

The reactor 351 includes an exhaust gas inlet 351-1, an absorbent inlet 351-2, a first reaction part 351-3, a reactant capturing part 351-4, a reactant outlet 351-5, an oxidizer inlet 351-6, a secondary reaction part 351-7, a droplet separator 351-8 and an exhaust gas outlet 351-9.

The gas discharged from the flue-gas desulfurization equipment 340 is introduced into the first reaction part through the exhaust gas inlet 351-1, and alkali absorbent is introduced into the first reaction part through the absorbent inlet 351-2.

In the first reaction part 351-3 occurs the desulfurization reaction in which the introduced exhaust gas and alkali absorbent react to absorb and neutralize sulfur dioxide ($SO_2$).

At this time, the ion absorption reaction, in which fine droplets containing sulfate ($SO_4^{2-}$) and chloride ions ($Cl^-$) included in the exhausts gas discharged from the flue-gas desulfurization equipment 340 react with alkali absorbent to be absorbed, occurs simultaneously.

The reactant, for which desulfurization reaction and ion absorption reaction are completed, is accompanied by gas to flow in the reactor 351, before it is captured by gravity in the reactant capturing part 351-4 under the reactor 351.

The captured reactant may contain alkali absorbent that has not reacted or partially reacted. Therefore, after discharging part of captured reactant through the reactant outlet 351-5, it is recycled and mixed with alkali absorbent for re-use. Through such a process, it is possible to increase the utilization rate and reduce the effluent treatment quantity.

An oxidizer is introduced into the gas that has passed the first reaction part 351-3 through the oxidizer inlet 351-6. At this time, a sodium chlorite, for example, may be used as the oxidizer.

In the secondary reaction part 351-7, the gas that has passed through the first reaction part 351-3 and the oxidizer supplied through the oxidizer inlet 351-6 react to make nitrogen dioxide ($NO_2$) which is then oxidized to nitrogen ions ($NO_3^-$). And these nitrogen ions ($NO_3^-$) proceed with the denitrification reaction in which they are absorbed by reacting with alkali absorbent that remains after desulfurization.

And mercury)($Hg^0$) vapor in an elemental state proceeds with the mercury absorption reaction in which the vapor is oxidized to become mercury oxide ($Hg^{2+}$) and then reacts with alkali absorbent in a wet state to be absorbed. At this time, also heavy metals other than mercury are absorbed by the alkali absorbent.

Since the oxidizer reacts with sulfur dioxide ($SO_2$) as well, it is preferable to feed it from under the secondary reaction part 351-7, which is the region where desulfurization completes. Also, it is preferable that the secondary reaction part 351-7 has a structure isolated from the first reaction part 351-3.

The gas for which denitrification and mercury absorption reactions were completed is fed to the droplet separator 351-8, where fine droplets are separated to keep off the droplets of alkali absorbent. The gas from which contaminants were removed is discharged through the exhaust gas outlet 351-9.

The reactor shown in FIG. 4 is for description of another process according to the present invention, and it can have various shapes and structures according to conditions such as process characteristics or operation space.

Figure 5:
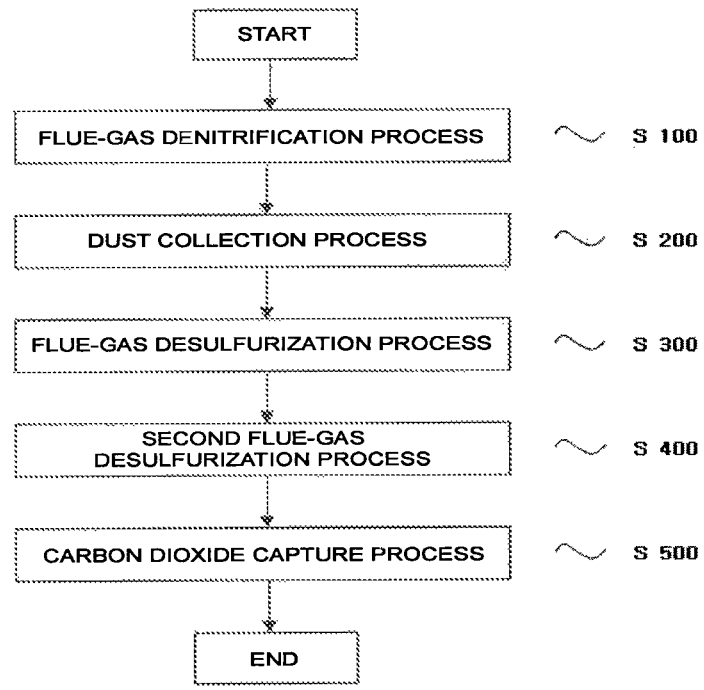
FIG. 5 is a flow chart showing processes of an exhaust gas treating method for a carbon dioxide capture process according to the present invention.
Figure 6:
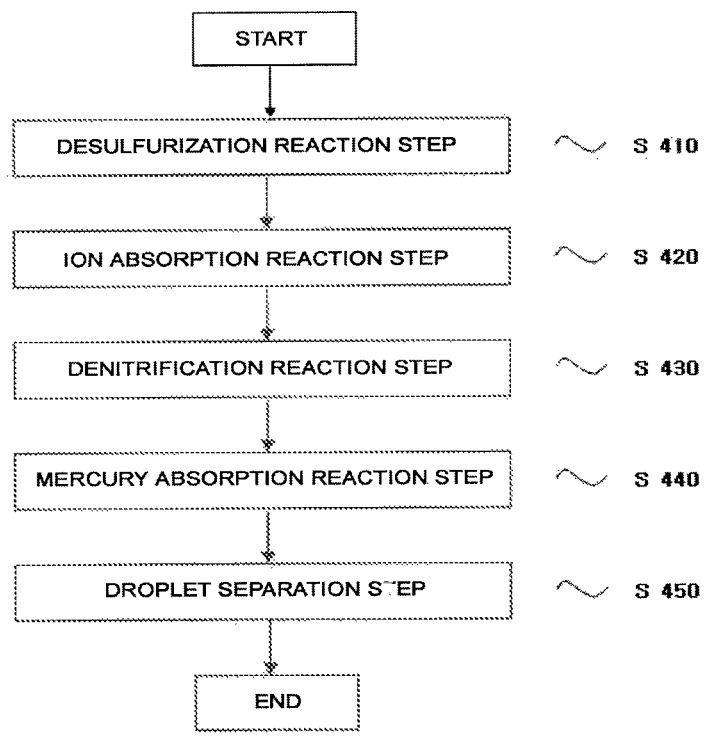
FIG. 6 is a flow chart showing in detail a secondary flue-gas desulfurization process in the process flow according to FIG. 5.

FIG. 5 is a flow chart showing processes of an exhaust gas treating method for a carbon dioxide capture process according to the present invention, and FIG. 6 is a flow chart showing in detail a secondary flue-gas desulfurization process in the process flow according to FIG. 5.

Referring to FIG. 5, an exhaust gas treating method for a carbon dioxide capture process according to the present invention includes a flue-gas denitrification process S100, a dust collection process S200, a flue-gas desulfurization process S300, a secondary flue-gas desulfurization process S400 and a carbon dioxide capture process S500.

Since the flue-gas denitrification process S100, dust collection process S200, flue-gas desulfurization process S300, and carbon dioxide capture process S500 are identical to the conventional ones, a detailed description thereof will be omitted. Namely, a detailed description will be given centering on the secondary flue-gas desulfurization process S400, which is a characteristic configuration of the present invention, with reference to FIG. 6.

The secondary flue-gas desulfurization process S400 removes contaminants such as nitrogen oxides, sulfur oxides and mercury remaining in the gases discharged through the flue-gas desulfurization process S300 to improve the cleanliness of the gas introduced in the carbon dioxide capture process S500.

As shown in FIG. 6, the secondary flue-gas desulfurization process S400 includes a desulfurization reaction step S410, an ion absorption reaction step S420, a denitrification reaction step S430, a mercury absorption reaction step S440 and a droplet separation step S450.

In the desulfurization reaction step S410, the alkali absorbent is sprayed on the gas discharged and introduced from the flue-gas desulfurization process S300 to remove sulfur oxides, and in the ion absorption reaction step S420, sulfate ions and chlorine ions included in fine droplets are reacted with the alkali absorbent before they are absorbed.

In the denitrification reaction step S430, the oxidizer is sprayed on the gas that has gone through the ion absorption reaction step S420 from under the secondary reaction part to oxidize nitrogen dioxide ($NO_2$) into nitrate ions ($NO_3^-$). After that, nitrate ions are absorbed by making them react with the alkali absorbent remaining after the desulfurization process.

In the mercury absorption reaction step S440, mercury ($Hg^0$) vapor in an elemental state is made to react with the oxidizer to oxidize it into mercury oxide ($Hg^{2+}$), which is then made to react with alkali absorbent before they are absorbed.

In the droplet separation step S450, fine droplets are separated to keep alkali droplets from being discharged together with exhaust gas. Namely, it plays a role of keeping alkali droplets from being introduced into the carbon dioxide capture process S500.

In the exhaust gas treating method for a carbon dioxide capture process according to the present invention, reaction in the processes from the desulfurization reaction step S410 to the droplet separation step S450 proceeds complexly in one reactor.

Meanwhile, in the secondary flue-gas desulfurization process S400, it is preferable to control the oxidation rate of the oxidizer by putting in the oxidizer after the point of time when the desulfurization reaction step S410 completed.

While the present invention has been described with reference to the preferred embodiments, it will be understood by those skilled in the related art that various modifications and variations may be made therein without departing from the scope of the present invention as defined by the appended claims.

What is claimed is:

1. An exhaust gas treating apparatus, in which an exhaust gas is fed to a carbon dioxide capture equipment after removing contaminants included in the exhaust gas by successively passing the exhaust gas discharged from combustion equipment for burning petroleum or fuel through flue-gas denitrification equipment, dust collection equipment and flue-gas desulfurization equipment, the apparatus comprising:

secondary flue-gas desulfurization equipment installed at a rear end of the flue-gas desulfurization equipment; and
   a reactor provided in the secondary flue-gas desulfurization equipment, wherein the reactor performs, in one reacting container, a process of removing contaminants containing nitrogen oxides, sulfur oxides and mercury remaining in the gas discharged from the flue-gas desulfurization equipment.

2. The apparatus of claim 1, wherein the reactor carries out, in one reacting container, a desulfurization reaction in which sulfur oxides are removed by spraying an alkali absorbent on the gas discharged and introduced from the flue-gas desulfurization equipment; an ion absorption reaction in which sulfate ions and chlorine ions in fine droplets are absorbed; a denitrification reaction in which an oxidizer is sprayed to oxidize and absorb nitrogen dioxide; and a mercury absorption reaction in which mercury in an elemental state is oxidized and absorbed, and the reactor has a structure in which droplets of the alkali absorbent are cut off by separating fine droplets after the desulfurization, ion absorption, desulfurization and mercury absorption reactions.

3. The apparatus of claim 2, wherein the reactor includes:
an exhaust gas inlet through which the gas discharged from the flue-gas desulfurization equipment is introduced;
an absorbent inlet through which the alkali absorbent is introduced;
a first reaction part in which the exhaust gas and the alkali absorbent react for a desulfurization reaction and an ion absorption reaction to proceed;
a reactant capture part in which the reactant that has undergone a desulfurization reaction and an ion absorption reaction;
a reactant outlet through which the reactant is discharged to re-use the absorbent included in the captured reactant;
an oxidizer inlet through which the oxidizer is introduced to the gas that has passed through the first reaction part;
a secondary reaction part in which the gas that has passed through the first reaction part reacts with the oxidizer for a denitrification reaction and a mercury absorption reaction to proceed;
a droplet separator for keeping off dust and alkali droplets; and
an exhaust gas outlet for discharging the exhaust gas with the alkali droplets separated.

4. The apparatus of claim 3, wherein the first reaction part and the secondary reaction part are isolated from each other.

5. The apparatus of claim 2, wherein the oxidizer is sodium chlorite.

6. The apparatus of any one of claims 1 to 5, further comprising a carbon dioxide capture equipment installed at a rear end of the secondary flue-gas desulfurization equipment, wherein a gas discharged from the secondary flue-gas desulfurization equipment is introduced into the carbon dioxide capture equipment.

7. An exhaust gas treating method, in which a carbon dioxide capture process is carried out after removing contaminants included in the exhaust gas by successively carrying out a flue-gas denitrification process, a dust collection process and a flue-gas desulfurization process for the exhaust gas discharged from combustion equipment for burning petroleum or coal, the method comprising:

a secondary flue-gas desulfurization process for removing contaminants containing nitrogen oxides, sulfur oxides and mercury remaining in the gas discharged after the flue-gas desulfurization process, before carrying out the carbon dioxide capture process.

8. The method of claim 7, wherein the secondary flue-gas desulfurization process includes:
a desulfurization reaction step in which an alkali absorbent is sprayed on the gas discharged and introduced from the flue-gas desulfurization process to remove sulfur oxides;
an ion absorption reaction step for absorbing sulfate ions and chlorine ions in fine droplets;
a denitrification reaction step in which an oxidizer is sprayed on a gas that has gone through the ion absorption reaction step to oxidize and absorb nitrogen dioxide;
a mercury absorption reaction step for oxidizing and absorbing mercury in an elemental state; and
a droplet separation step in which fine droplets are separated and the gas is discharged out and alkali droplets are recovered to be prevented from being discharged out.

9. The method of claim 8, wherein the secondary flue-gas desulfurization process proceeds in one reactor.

10. The method of claim 9, wherein the secondary flue-gas desulfurization process includes a putting an oxidizer after the point of time when the desulfurization reaction step is completed to control the oxidation rate of the oxidizer.

* * * * *